UNITED STATES PATENT OFFICE.

BERNHARD JAECKEL, OF ELBERFELD, GERMANY, ASSIGNOR TO SYNTHETIC PATENTS CO., INC., OF NEW YORK, N. Y., A CORPORATION OF NEW YORK.

SULFUR DYE.

1,140,745.

Specification of Letters Patent. Patented May 25, 1915.

No Drawing. Application filed September 11, 1914. Serial No. 861,284.

*To all whom it may concern:*

Be it known that I, BERNHARD JAECKEL, chemist, doctor of philosophy, citizen of the German Empire, residing at Elberfeld, Germany, have invented new and useful Improvements in Sulfur Dyes, of which the following is a specification.

I have found that new and valuable sulfur dyes can be obtained by heating with sulfur and benzidin compounds aromatic bases having most probably the formula:

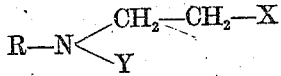

Y includes hydrogen and alkyl e. g.— H, —CH$_3$, —C$_2$H$_5$, —CH$_2$—C$_6$H$_5$; X standing for a substituent e. g. —OH, —OC$_2$H$_5$, —NHC$_6$H$_5$; and R standing for an aromatic hydrocarbon radical e. g.

C$_6$H$_5$—,

C$_{10}$H$_7$—(naphthylamin),

—C$_6$H$_4$—C$_6$H$_4$—NH$_2$(benzidin),

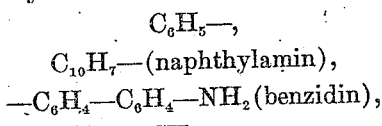

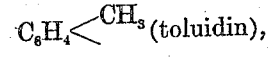

Such starting materials for the production of my new sulfur colors are e. g. ethylanilin, methylethylanilin, ethyltoluidin, ethylxylidin, ethyl-alpha- and beta-naphthylamin, ethylbenzidin, oxyethylanilin

C$_6$H$_5$—NH—CH$_2$—CH$_2$—OH, ethylendiphenyldiamin

C$_6$H$_5$—NH—CH$_2$—CH$_2$—NH—C$_6$H$_5$, etc.

The new sulfur colors are after being dried and pulverized yellowish powders insoluble in water, scarcely soluble in hot alcohol, ether and benzene. They are soluble in concentrated sulfuric acid generally with a yellowish-brown coloration. My new products are distinguished by dyeing cotton pure yellow shades fast to boiling and to chlorin.

In order to illustrate my new process more fully the following example is given, the parts being by weight:—17.6 parts of ethylanilin and 27 parts of benzidin are heated to 170–180° C. during 4–6 hours together with 80 parts of sulfur. Subsequently the temperature is slowly raised to 230–250° C. After 6–8 hours the reaction is complete. The well powdered melt is then dissolved in 200 parts of caustic soda lye (35° Bé.) by heating to 110–120° C. After diluting the solution with water to 1000 parts the dye is precipitated by means of dilute hydrochloric acid in the shape of a yellow precipitate. It is after being dried and pulverized a yellow powder insoluble in water, soluble in concentrated sulfuric acid with a yellowish-brown coloration. It dyes unmordanted cotton from an alkaline hydrosulfite bath or a sodium sulfid bath pure and brilliant greenish-yellow shades fast to boiling and to chlorin. After the dyeing the cotton is to be rinsed with dilute acetic acid to obtain the pure yellow shades.

I claim:—

1. The new sulfur dyes obtainable by heating with sulfur and benzidin compounds aromatic bases having most probably the formula:

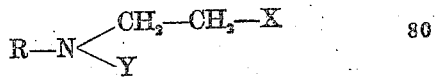

in which X includes hydrogen and alkyl, Y stands for a substituent, and R stands for an aromatic hydrocarbon radical which dyes are after being dried and pulverized yellowish powders being insoluble in water and soluble in concentrated sulfuric acid generally with a yellowish-brown coloration; and dyeing unmordanted cotton generally yellow shades fast to chlorin and to boiling, substantially as described.

2. The new sulfur dyes obtainable by heating with sulfur and benzidin compounds aromatic bases having most probably the formula

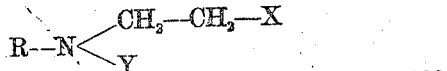

in which X includes hydrogen and alkyl, Y stands for a substituent, and R stands for an aromatic hydrocarbon radical of the benzene series, which dyes are after being dried and pulverized yellowish powders being insoluble in water and soluble in concentrated sulfuric acid generally with a yellowish-brown coloration; and dyeing unmordanted cotton generally yellow shades fast to chlorin and to boiling, substantially as described.

3. The new sulfur dye obtained from ethylanilin and benzidin, which is after being dried and pulverized a yellow powder insoluble in water and soluble in concentrated sulfuric acid with a yellowish-brown coloration; and dyeing unmordanted cotton in pure and greenish-yellow shades fast to chlorin and to boiling, substantially as described.

In testimony whereof I have hereunto set my hand in the presence of two subscribing witnesses.

BERNHARD JAECKEL. [L. S.]

Witnesses:
  HELEN NUFER,
  ALBERT NUFER.